(12) United States Patent
Mitsutani et al.

(10) Patent No.: US 6,552,807 B1
(45) Date of Patent: Apr. 22, 2003

(54) APPARATUS AND METHOD FOR SHAPE MEASUREMENT USING INTERFEROMETER

(75) Inventors: Naoki Mitsutani, Tsukuba (JP); Kazuhiko Kawasaki, Tsukuba (JP); Hiroshi Haino, Tsukuba (JP)

(73) Assignee: Mitutoyo Corporation, Kawasaki (JP)

( * ) Notice: Subject to any disclaimer, the term of this patent is extended or adjusted under 35 U.S.C. 154(b) by 269 days.

(21) Appl. No.: 09/676,935

(22) Filed: Oct. 2, 2000

(30) Foreign Application Priority Data

Oct. 4, 1999 (JP) .......................................... 11-283046

(51) Int. Cl.⁷ .............................................. G01B 9/02
(52) U.S. Cl. ...................................................... 356/512
(58) Field of Search ................................ 356/512, 513, 356/514, 489, 495, 511, 508, 510

(56) References Cited

U.S. PATENT DOCUMENTS

| 5,398,112 A | 3/1995 | Ai et al. |
| 5,650,853 A * | 7/1997 | Honda et al. ................. 356/514 |
| 5,914,782 A * | 6/1999 | Sugiyama .................... 356/491 |

\* cited by examiner

Primary Examiner—Samuel A. Turner
Assistant Examiner—Michael A. Lyons
(74) Attorney, Agent, or Firm—Oliff & Berridge PLC

(57) ABSTRACT

A phase shift interferometer (4) images a plurality of interference fringe images each generated from interference between a test light reflected at a test surface (3a) and a reference light reflected at an reference surface (5) by emitting a coherent light to both surfaces while varying a phase difference between the test light and the reference light from image to image. A surface shape analyzer (12) analyzes the plurality of interference fringe images taken by the phase shift interferometer (4) to obtain surface shape information of the test surface (3a). A typical plane computer (13) computes a typical plane of the test surface (3a) on the basis of the surface shape information obtained from the surface shape analyzer (12). An oblique angle computer (14) computes an oblique angle of the typical plane computed by the typical plane computer (13) to the reference surface (5). An attitude adjusting mechanism (2) automatically adjusts the attitude of the test surface (3a) relative to the reference surface (5) on the basis of information of the oblique angle computed by the oblique angle computer (14).

10 Claims, 6 Drawing Sheets

APPARATUS AND METHOD FOR SHAPE MEASUREMENT USING INTERFEROMETER

BACKGROUND OF THE INVENTION

1. Field of the Invention

The present invention relates to an apparatus and method for measuring a surface shape of an object having a test surface (i.e. a surface under test) using an interferometer that images interference fringe images generated from test lights (i.e. lights reflected surface under test) and reference lights (i.e. lights reflected reference surface flat). More particularly, the present invention relates to an attitude control system for an apparatus that employs a plurality of interference fringe images caused from lights phase-shifted between the test surface and reference surface (i.e. reference flat surface).

2. Description of the Related Art

In an interferometer, an interferogram can be obtained between a test light and a reference light(standard surface) that is incorporated in the interferometer. An optical surface shape measurement apparatus known in the art employs the interferometer to take interference fringe images and analyzes the images to measure a plane surface shape.

In order to control the attitude of the test surface relative to the reference surface in the interferometer, an obliquity between the test surface and the reference surface is determined in the art based on a fringe interval or fringe direction in the interferograms. In this case, at least two interferograms are required to determine the obliquity. In addition, whereas the degree of the obliquity can be found from a single interference fringe image, it is not possible to even find the direction of the obliquity. It is required for finding the direction of the obliquity to confirm the direction of a deviation of the interferogram when the attitude of the test surface is slightly varied. Thus, an operator in the art is required to manually adjust the attitude along with viewing the interferograms.

On the other hand, if two or more interferograms can be seen as described above, it indicates that the test surface relatively tilts from the reference surface and this situation is not suitable for a high accuracy measurement. In an interferogram analysis measurement, desirably an angle between the test surface and the reference surface is near zero as far as possible. Nevertheless, if the test surface is a flat plane and its angle to the reference surface is near zero, the interval between the interferograms extends over the whole observing surface, causing a state a null-interference that exhibits an entirely uniform, bright or dark screen. It is not possible in this state to execute a high accuracy attitude control for adjusting an extremely small oblique angle between the test surface and the reference surface.

As described above, the conventional apparatus for interferogram analysis measurement has a disadvantage because the attitude control of the test surface relative to the reference surface is not easy. In addition, when a high accuracy surface shape measurement is desirable to be performed in the state of null-interference, which has a small obliquity between the almost flat test surface and the reference surface, the attitude can not be controlled disadvantageously.

SUMMARY OF THE INVENTION

The present invention accordingly has an object to provide an optical surface shape measurement apparatus and method capable of controlling the attitude of a test surface relative to a reference surface in an automatic manner with a high accuracy using an interferogram measurement by the phase shift method.

The present invention is provided with an optical surface shape measurement apparatus using an interferometer. The apparatus comprises a phase shift interferometer for imaging at least three interference fringe images each generated by emitting a coherent light to an object having a test surface and to a reference having a reference surface so that a test light reflected from the test surface interferes with a reference light reflected from the reference surface while varying a phase difference between the test light and the reference light from image to image; a surface shape analyzer for analyzing the at least three interference fringe images taken by the phase shift interferometer to obtain surface shape information of the test surface; a typical plane computer for computing a typical plane of the test surface on the basis of the surface shape information obtained from the surface shape analyzer; an oblique angle computer for computing an oblique angle of the typical plane computed by the typical plane computer to the reference surface; and an attitude adjusting mechanism for automatically adjusting the attitude of the test surface relative to the reference surface on the basis of the oblique angle computed by the oblique angle computer.

The present invention is also provided with an optical surface shape measurement method using an interferometer. The method comprises the steps of: imaging at least three interference fringe images each generated by emitting a coherent light to an object having a test surface and to a reference having a reference surface so that a test light reflected from the test surface interferes with a reference light reflected from the reference surface while varying a phase difference between the test light and the reference light from image to image; analyzing the at least three interference fringe images to obtain surface shape information of the test surface; computing at typical plane of the test surface on the basis of the surface shape information; computing an oblique angle of the typical plane to the reference surface; and automatically adjusting the attitude of the test surface relative to the reference surface on the basis of the oblique angle.

According to the present invention, the use of the phase shift interferometer allows an obliquity of the test surface to be obtained even if an angle between the test surface and the reference surface is near zero. This makes it possible to realize an optical surface shape measurement apparatus with the interferogram measurement, which an control the attitude of the test surface relative to the reference surface in an automatic manner with a high accuracy.

According to the present invention, the use of the phase shift interferometer allows an obliquity of the test surface to be obtained even if an angle between the test surface and the reference surface is near zero. This makes it possible to realize an optical surface shape measurement apparatus with the interferogram measurement, which can control the attitude of the test surface relative to the reference surface in an automatic manner with a high accuracy.

The phase shift interferometer in the present invention may, for example, (a) image at least three interference fringe images with time differences by slightly displacing the reference surface along the optical axis; and (b) image at least three interference fringe images with time differences by variably controlling the wavelength of the coherent light. These cases only require a single imaging device.

Alternatively, the phase shift interferometer may comprise an original beam generator for generating an original beam by superimposing the test light and the reference light within the same observing surface in a state of null-interference; a beam splitter for splitting the original beam generated from the original beam generator into three output beams; an interference system for allowing the test light to interfere with the reference light while varying a phase difference between said test light and said reference light for each of the three output beams obtained from the beam splitter; and three imaging devices for imaging interferograms regarding the three output beams obtained from the interference system.

Other features and advantages of the invention will be apparent from the following description of the preferred embodiments thereof.

BRIEF DESCRIPTION OF THE DRAWINGS

The present invention will be more fully understood from the following detailed description with reference to the accompanying drawings in which.

DETAILED DESCRIPTION OF THE PREFERRED EMBODIMENTS

Embodiments of the present invention will be described below with reference to the drawings.

Figure 1:
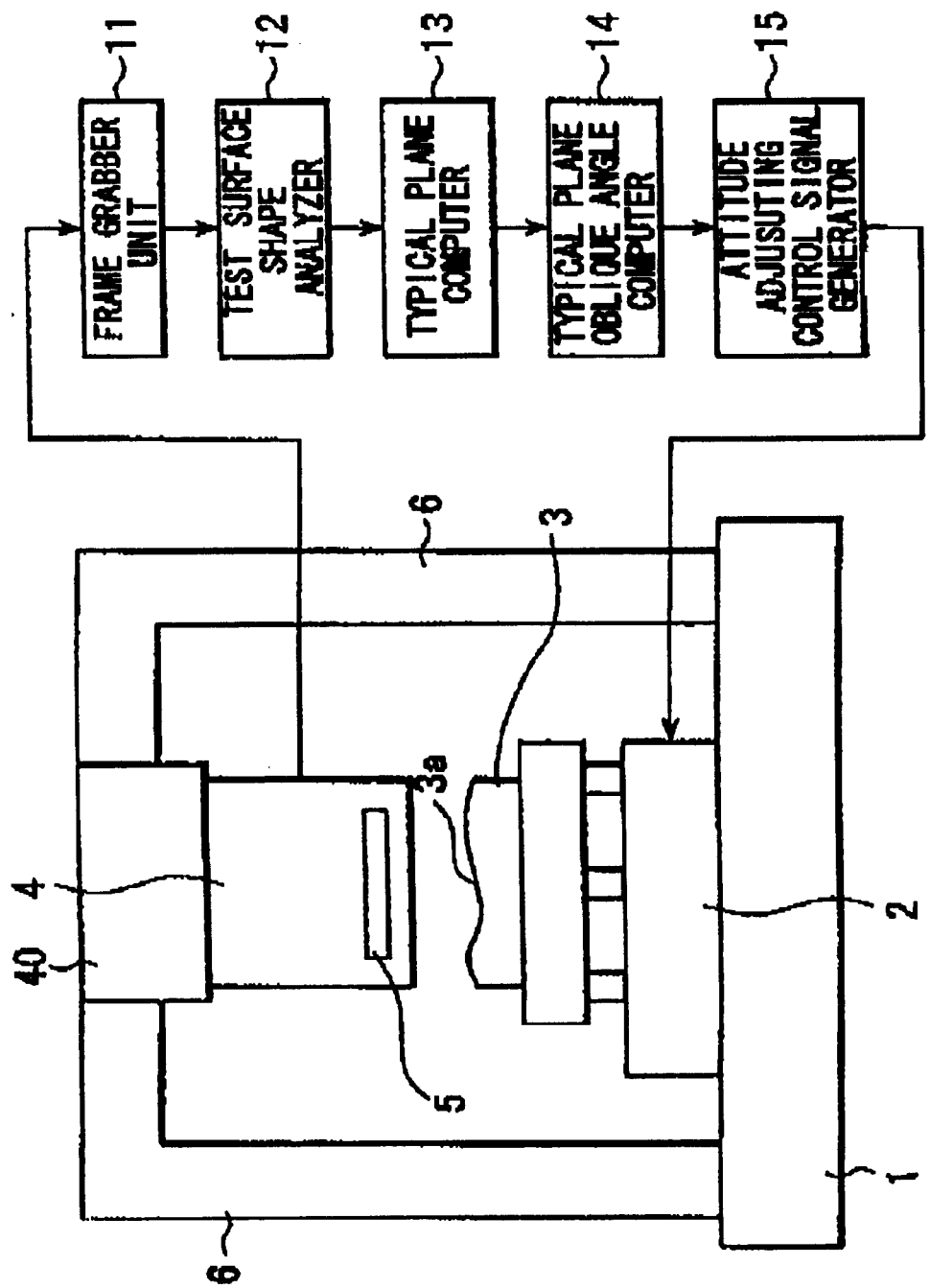
FIG. 1 illustrates an arrangement of an optical surface shape measurement apparatus according to an embodiment of the present invention.

FIG. 1 shows an arrangement of an interferogram measurement apparatus, with the phase shift method, according to an embodiment of the present invention. A phase shift interferometer 4, which is employed for taking a plurality of (at least three) interference fringe images with different phases as described later, is fixedly attached by an attaching mechanism 40 to a frame 6 standing on a base 1. The phase shift interferometer 4 includes a reference surface 5 internally. An object 3, which receives a beam emitted from the phase shift interferometer 4, facing its test surface 3a upwardly, is mounted on an attitude adjusting mechanism 2 and disposed above the base 1.

Figure 2:
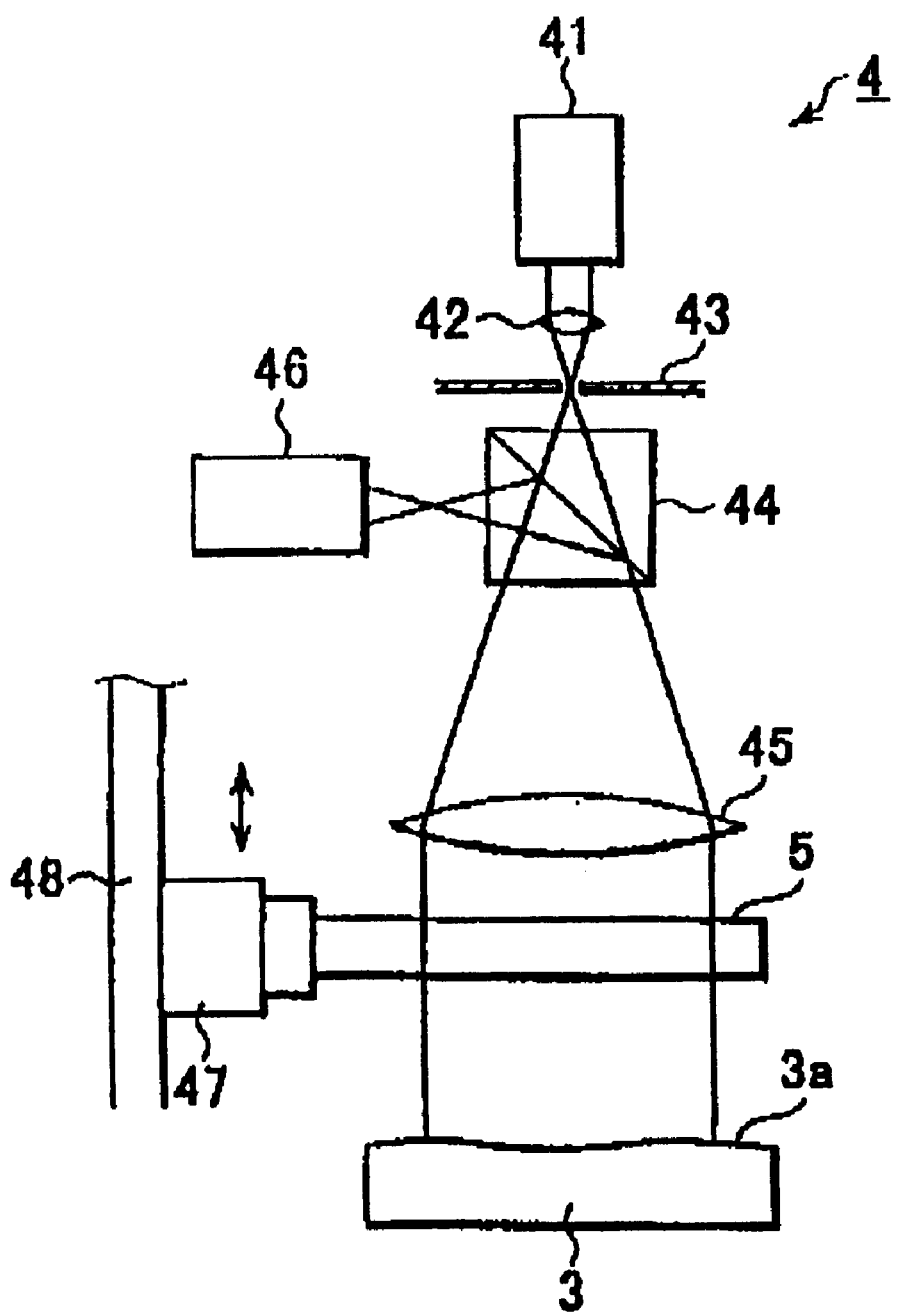
FIG. 2 illustrates an exemplified arrangement of a phase shift interferometer for use in the same embodiment.

FIG. 2 illustrates an exemplified arrangement of the phase shift interferometer 4. A beam from a laser light source 41 that emits a coherent light is focused through a lens 42 and then converted into a spot light source through an iris 43 having a pinhole formed therethrough. The light from this spot light source is emitted onto the reference surface 5 after transmitting through a non-polarizing beam splitter 44 and then converted into a parallel light through a collimate lens 45. The reference surface 5 is semi-transparent and semi-reflective, and a light transmitted therethrough is emitted onto the object 3.

A light reflected from the reference surface 5 (referred to as a reference light) and a light reflected from the test surface 3a (referred to as a test light) are further reflected at the non-polarizing beam splitter 44 and enter into a CCD camera 46. The CCD camera 46 images an interferogram caused from a phase difference between the reference light and the test light. The reference surface 5 herein described is slightly movable along a guide 48 upwardly/downwardly (in the direction along the optical axis of the beam that enters the reference surface 5) by a driving mechanism 47, which enables it to obtain a plurality of interference fringe images with slightly different phases.

As shown in FIG. 1, the plural interference fringe images obtained from the phase shift interferometer 4 are fed to a frame grabber unit 11 and then sent to a test surface shape analyzer 12. The test surface shape analyzer 12 analyzes data of the interference fringe images and computes surface shape information including oblique information of the test surface 3a to the reference surface 5.

Thus configured measurement apparatus further comprises, in this embodiment, a typical plane computer 13, a typical plane oblique angle computer 14 and an attitude adjusting control signal generator 15, for controlling the attitude of the test surface 3a relative to the reference surface 5.

The typical plane computer 13 computes a typical plane of the test surface 3a based on the surface shape information obtained from the test surface shape analyzer 12. This computation of the typical plane can be executed by, for example, (a) a method using the least square method to obtain an averaged plane surface shape as the typical plane; and (b) a method of computing a scribed plane at two orthogonal cross sections that cross with each other at near the center of an image. Other known methods may also be applied, such as a method of computing a plane that circumscribes all plane data (a plane that is in contact with at least three points at the peak portion); and a method of computing an inscribed plane (a plane that is in contact with at least three points at the trough portion).

The typical plane, computed at the typical plane computer 13, includes oblique information relative to the reference surface 5. The oblique angle computer 14 then computes an oblique angle between the typical plane and the reference surface 5. Thus computed oblique angle is sent to the attitude adjusting control signal generator 15, which in turn supplies to the attitude adjusting mechanism 2 an attitude control signal for adjusting the computed oblique angle to a certain value such as zero.

In this embodiment, the oblique angle of the test surface 3a is computed based on a plurality of interference fringe images obtained by the phase shift method. Therefore, it is possible to determine such a small oblique angle that can not be determined only from a single interference fringe image because it is, for example, in the state of null-interference. Thus, the attitude of the test surface 3a relative to the reference surface 5 can be adjusted in an automatic manner with a high accuracy.

Figure 3:
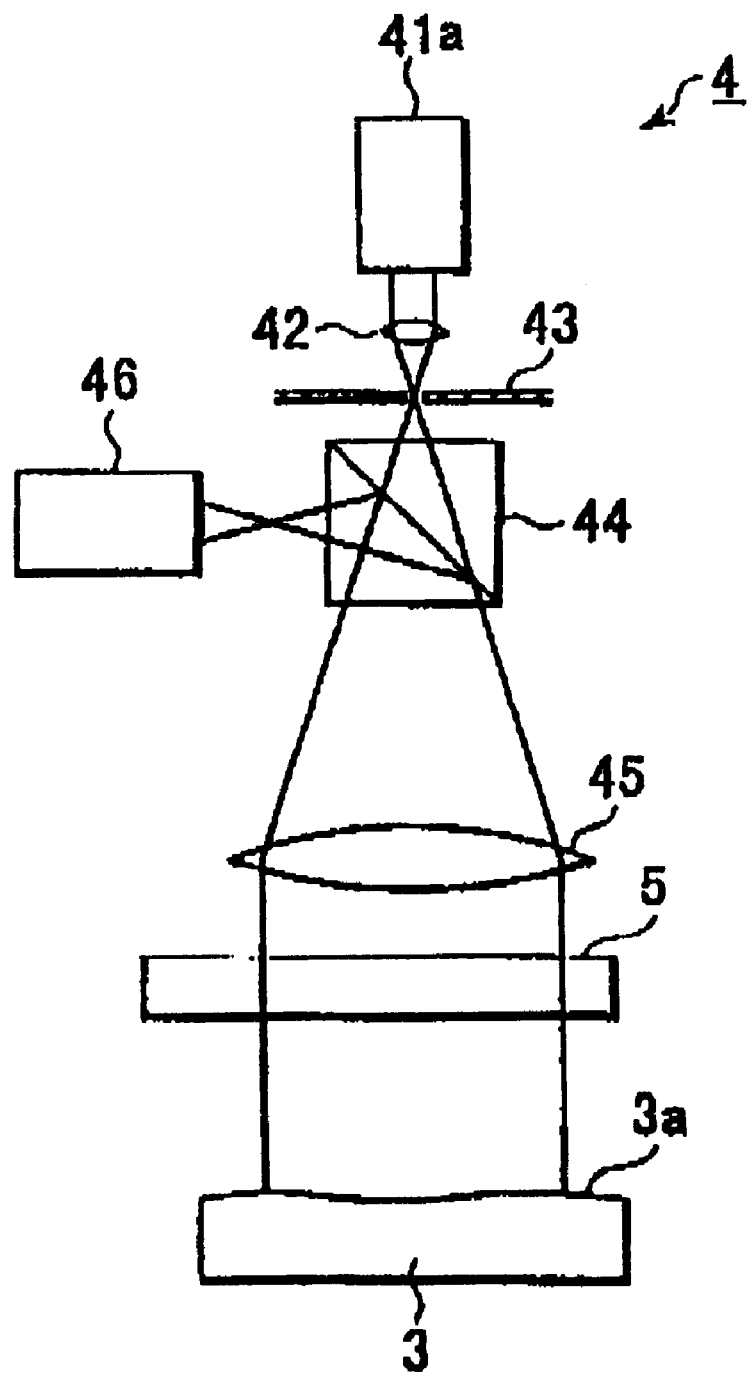
FIG. 3 illustrates another exemplified arrangement of a phase shift interferometer for use in the same embodiment.

FIG. 3 shows another exemplified arrangement of the phase shift interferometer 4, in which the same reference numerals are given to the same parts as those in FIG. 2 and their detailed description are omitted. FIG. 3 differs from FIG. 2 in that a variable wavelength laser is employed in FIG. 3 as a laser light source 41a instead of the use of the driving mechanism 47 for displacing the reference surface 5 that is employed in FIG. 2. When the wavelength of the laser light source 41a is switches, interference fringe images with plural different phases can be obtained like in the case of FIG. 2.

Figure 4:
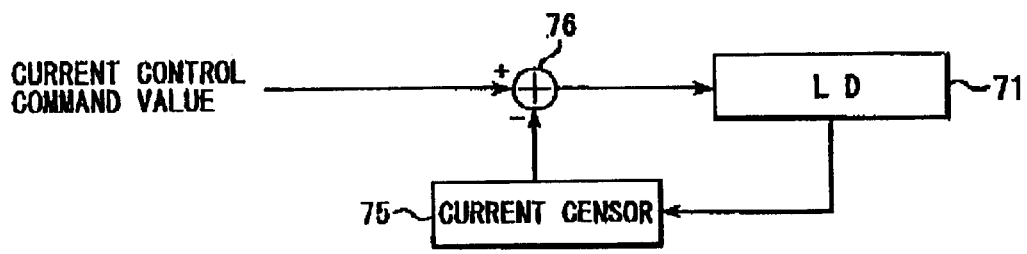
FIG. 4 shows a laser light source in detail for use in the same embodiment.

FIG. 4 shows a circuit configuration of the laser light source 41a for use in the present arrangement. A current sensor 75 always monitors the output current from the LD 71. A subtractor 76 obtains a finite difference between the output from the current sensor 75 and a current control command value to drive the LD 71 based on the finite difference. When the current control command value is varied in order to change the drive current for the LD 71 within a range of about 10 mA, for example, an extremely small variation can be caused on optical wavelengths, resulting standard wavelengths ranging from 635 nm to 780 nm while substantially maintaining a constant light intensity.

The phase shift interferometer 4 in FIGS. 2 and 3 is intended to image a plurality of interference fringe images with different phases successively in time sequence. Alternatively, the phase shift interferometer 4 may be configured as the one that can image a plurality of interference fringe images simultaneously.

Figure 5:
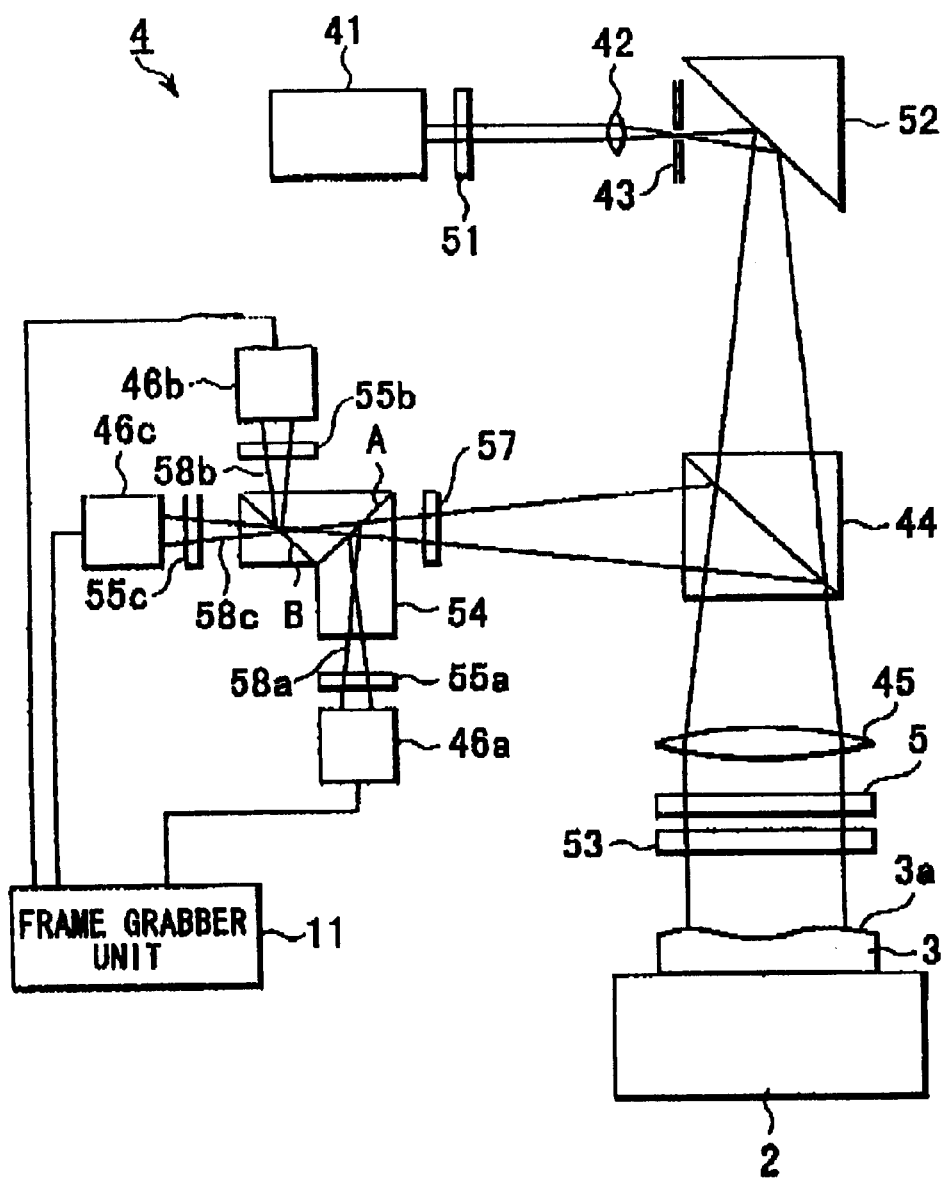
FIG. 5 illustrates another exemplified arrangement of a phase shift interferometer for use in the same embodiment.

FIG. 5 shows an exemplified arrangement of such the phase shift interferometer 4, in which the same reference numerals are also given to the same parts as those in FIG. 2. In the phase shift interferometer 4 shown in FIG. 5, arranged first at the output portion of the laser light source 41 is a polarizer 51 that converts the output light from the source into a linearly polarized light. The linearly polarized light is further converted into a spot light source through the lens 42 and the iris 43 and, after a total-reflective mirror 52 alters its optical path, it enters into the non-polarizing beam splitter 44. A light transmitted through the non-polarizing beam splitter 44 is converted into a parallel light through the collimate lens 45 and emitted onto the reference surface 5 and then to the test surface 3a. A quarter waveplate 53 is arranged between the reference surface 5 and the test surface 3a. Therefore, the light emitted to the test surface 3a becomes a circularly polarized light. In addition, the test light, first reflected from the test surface 3a and then transmitted through the quarter waveplate 53, becomes a linearly polarized light that is perpendicular to the reference light or the light reflected from the reference surface 5.

The reference light and the test light, both reflected from the non-polarizing beam splitter 44, further transmit through another quarter waveplate 57 and become circularly polarized lights having opposite rotational directions to each other. An original beam, consisting of the circularly polarized lights that have been obtained up to now, is in such a situation that the reference light overlaps the test light in the state of null-interference. The original beam is then split into three output beams 58a, 58b and 58c at a three-way split prism 54. It is assumed that a first split interface A in the three-way split prism 54 acts to produce a reflected light with a relative intensity of 1 and a transmitted light with a relative intensity of 2. This reflected light is employed as a first output beam 58a. It is also assumed that a second split interface B acts to produce a reflected light and a transmitted light with an intensity ratio of 1:1. This reflected light is employed as a second output beam 58b and the transmitted light a third output beam 58c.

CCD cameras 46a, 46b and 46c are arranged corresponding to the three output beams 58a, 58b and 58c obtained from the three-way split prism 54. Arranged in front of the CCD cameras 46a, 46b and 46c are polarizers 55a, 55b and 55c, each of which has a unique polarizing direction, for example, 45-degree different from each other in relation to the polarizer 51 at the light source side. By means of these polarizers 55a, 55b and 55c, three different interferograms are produced in such a manner that a test light of each output beam interferes with a corresponding reference light, with a phase difference that differs from those regarding other output beams. The CCD cameras 46a, 46b and 46c simultaneously image these interferograms as three interference fringe images with different phases.

The use of such the phase shift interferometer of simultaneous measurement type can eliminate the influence of fluctuations due to a lapse of time in the case of imaging the different phase interference images successively in time sequence. Accordingly, the attitude control using the plural interference fringe images tends to have a much higher accuracy.

Specifically in this embodiment, the test surface shape analyzer 12 computes a height at each location on the test surface from data of the plural interference fringe images in the following manner. The interference fringe images are required at least three. An example herein described uses the method of FIG. 3 that switches the wavelength within an extremely small range to obtain three interference fringe images with slightly shifted phases. Three wavelengths are denoted with $\lambda_k = \lambda \cdot \alpha$, $\lambda$ and $\lambda + \beta$. When a distance between the test surface 3a and the reference surface 5 is assumed $z(x, y)$ relative to $(x,y) \in S$, then a phase deviation becomes $(2\,z/\lambda_k) \times 2\pi = 4\pi z/\lambda_k$.

Therefore, a light intensity distribution in the three interference fringe images is represented with regard to any location $(x,y) \in S$ by the following equation (1):

$$I_1(x, y) = I_B(x, y) + I_A(x, y)\cos\left(\frac{4\pi z(x, y)}{\lambda} + \frac{4\pi z(x, y)}{\lambda^2}\alpha\right) \quad (1)$$

$$I_2(x, y) = I_B(x, y) + I_A(x, y)\cos\left(\frac{4\pi z(x, y)}{\lambda}\right)$$

$$I_3(x, y) = I_B(x, y) + I_A(x, y)\cos\left(\frac{4\pi z(x, y)}{\lambda} - \frac{4\pi z(x, y)}{\lambda^2}\beta\right)$$

where $I_x(x, y)$ denotes a measured value of a light intensity; $I_B(x, y)$ a bias value of an interferogram; and $I_A(x, y)$ an amplitude value.

When substitutions are executed in the equation (1) with $4\pi z(x, y)/\lambda = \theta$, $4\pi z(x, y)\alpha/\lambda^2 = \alpha'$ and $4\pi z(x, y)\beta/\lambda^2 = \beta'$, the equation (1) is represented by:

$$\begin{pmatrix} I_B \\ I_A \cos\theta \\ I_A \sin\theta \end{pmatrix} = \begin{pmatrix} 1 & \cos\alpha' & -\sin\alpha' \\ 1 & 1 & 0 \\ 1 & \cos\beta' & \sin\beta' \end{pmatrix}^{-1} \begin{pmatrix} I_1 \\ I_2 \\ I_3 \end{pmatrix} \quad (2)$$

where the height information $z(x, y)$ in $\alpha'$ and $\beta'$ is assumed to give an averaged one. Resolving the equation (2) gives a phase $\theta$ as follows:

$$\theta = \tan^{-1}\left(\frac{I_1(1 - \cos\beta') + I_2(\cos\beta' - \cos\alpha') + I_3(-1 + \cos\alpha')}{I_1 \sin\beta' - I_2(\sin\beta' + \sin\alpha') + I_3 \sin\alpha'}\right) \quad (3)$$

Resolving the equation (3) gives a height $z(x, y) = \theta\lambda/4\pi$ and therefore a surface shape.

The typical plane computation by the least square method is performed in the following manner as specifically described. As described above, a height at each location in the test surface can be determined at the test surface shape analyzer 12. Then, by indicating an averaged oblique plane of the test surface with $z = ax + by + c$ ($x, y \in S$), parameters $a$, $b$ and $c$ can be obtained from the following equation (4):

$$\begin{pmatrix} a \\ b \\ c \end{pmatrix} = \frac{1}{k} \begin{pmatrix} \alpha_1\beta_1 + \alpha_4\beta_2 + \alpha_5\beta_3 \\ \alpha_4\beta_1 + \alpha_2\beta_2 + \alpha_4\beta_3 \\ \alpha_5\beta_1 + \alpha_6\beta_2 + \alpha_3\beta_3 \end{pmatrix} \quad (4)$$

where $$k = \left( -n \sum_{h=1}^{n} x_h^2 \sum_{h=1}^{n} y_k^2 + \sum_{h=1}^{n} x_h^2 \left( \sum_{h=1}^{n} y_k \right)^2 + n \sum_{h=1}^{n} x_h \left( \sum_{h=1}^{n} y_h \right)^2 - \right.$$

$$\left. 2 \sum_{h=1}^{n} x_h y_k \sum_{h=1}^{n} x_h \sum_{h=1}^{n} y_k + \left( \sum_{h=1}^{n} x_h \right)^2 \sum_{h=1}^{n} y_h^2 \right)$$

$$\alpha_1 = \left( \sum_{h=1}^{n} y_k \right)^2 - n \sum_{h=1}^{n} y_k^2, \ \alpha_2 = \left( \sum_{h=1}^{n} x_k \right)^2 - n \sum_{h=1}^{n} x_h^2,$$

$$\alpha_3 = -\sum_{h=1}^{n} x_h^2 \sum_{h=1}^{n} y_k^2 + \sum_{h=1}^{n} x_h \left( \sum_{h=1}^{n} y_h \right)^2$$

$$\alpha_4 = n \sum_{h=1}^{n} x_k y_h - \sum_{h=1}^{n} x_h \sum_{h=1}^{n} y_h,$$

$$\alpha_5 = \sum_{h=1}^{n} x_h \sum_{h=1}^{n} y_k^2 - \sum_{h=1}^{n} y_k \sum_{k=1}^{n} x_k y_h,$$

$$\alpha_6 = -\sum_{h=1}^{n} x_k \sum_{h=1}^{n} x_k y_h + \sum_{h=1}^{n} y_k \sum_{h=1}^{n} x_h^2$$

$$\beta_1 = \sum_{h=1}^{n} x_h z_k, \ \beta_2 = \sum_{h=1}^{n} y_h z_k, \ \beta_3 = \sum_{h=1}^{n} x_k$$

where the number of points, n, is required at least three, preferably nine.

As obvious from the above, the phase shift method is not the one that obtains the surface shape and oblique information from two-dimensional gray information in a single image. Rather, it computes a phase information from three or more phase-shifted interference fringe images. Therefore, it is possible to obtain the surface shape and oblique information, independent of the number of the interferograms, even in the state of null-interference. Once the average oblique information parameters a, b and c are obtained as described above, a normal vector of the oblique plane is represented by the following equation (5):

$$U = \frac{1}{\sqrt{a^2 + b^2 + 1}} (-a, -b, 1) \quad (5)$$

The attitude adjusting control signal generator 15 then controls an angle between the normal vector and the reference surface so that it comes to 90-degree, for example.

Figure 6:
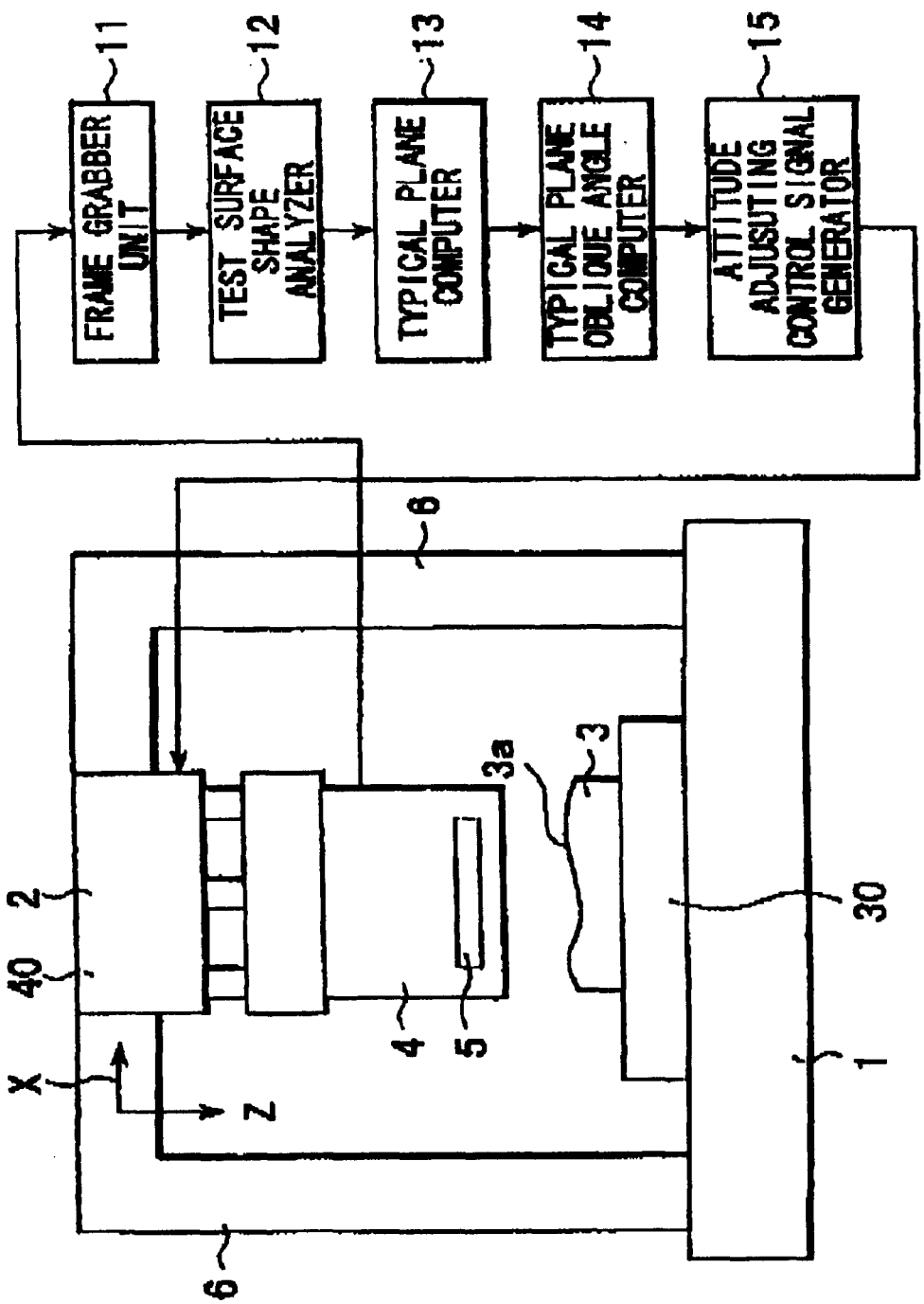
FIG. 6 illustrates an arrangement of an optical surface shape measurement apparatus according to another embodiment of the present invention.

FIG. 6 shows an alternative of the embodiment of FIG. 1. In this alternative embodiment, the object 3 is disposed on a simple mounting bed 30 above the base 1. Instead, the attitude adjusting mechanism 2, capable of varying the attitude of the phase shift interferometer 4, is contained inside the attaching mechanism 40 for the phase shift interferometer 4. Other configurations are the same a those of the embodiment in FIG. 1. According to this alternative, it is also possible to execute a high accuracy control for the attitude of the test surface 3*a* relative to the reference surface 5.

Further, it is effective in the embodiment of FIG. 6 to turn the phase shift interferometer 4 into a scanning interferometer by providing the attaching mechanism 40 with a three-axial mechanism for driving in X-, Y- and Z-directions. This makes it possible to measure a surface shape of the test surface 3*a* in a wider range. In particular, if the phase shift interferometer 4 is the apparatus for simultaneous measurement of phase-shifted interferograms as shown in FIG. 5, any period of time is not required to slightly displace the reference surface and to switch the wavelength of the light source, at each observing area. This makes it possible to perform a fast measurement in a wider range. As a result, a plane surface shape measurement can be performed on a large test surface without suffering any influence to a measurement accuracy due to the undulation and obliquity.

According to the present invention as described above, by means of analysis of a plurality of interference fringe images using the phase shift interferometer, it is possible to realize an optical surface shape measurement apparatus with the interferogram measurement, which can control the attitude of the test surface relative to the reference surface in an automatic manner with a high accuracy.

Having described the embodiments consistent with the present invention, other embodiments and variations consistent with the invention will be apparent to those skilled in the art. Therefore, the invention should not be viewed as limited to the disclosed embodiments but rather should be viewed as limited only by the spirit and scope of the appended claims.

What is claimed is:

1. An apparatus for surface shape measurement using an interferometer, comprising:

a phase shift interferometer for imaging at least three interference fringe images each generated by emitting a coherent light to an object having a test surface and to a reference having a reference surface so that a test light reflected from said test surface interferes with a reference light reflected from said reference surface while varying a phase difference between said test light and said reference light from image to image;

a surface shape analyzer for analyzing said at least three interference fringe images taken by said phase shift interferometer to obtain surface shape information of said test surface;

a typical plane computer for computing a typical plane of said test surface on the basis of said surface shape information obtained from said surface shape analyzer;

an oblique angle computer for computing an oblique angle of said typical plane computed by said typical plane computer to said reference surface; and an attitude adjusting mechanism for automatically adjusting the attitude of said test surface relative to said reference surface on the basis of said oblique angle computed by said oblique angle computer.

2. The apparatus of claim 1, wherein said phase shift interferometer images said at least three interference fringe images in sequential by slightly displacing said reference surface along the optical axis of said coherent light.

3. The apparatus of claim 1, wherein said phase shift interferometer images said at least three interference fringe images in sequential by varying the wavelength of said coherent light emitted to said object and said reference.

4. The apparatus of claim 1, wherein said phase shift interferometer comprises:

an original beam generator for generating an original beam by superimposing said test light and said reference light within the same observing surface in a state of null-interference;

a beam splitter for splitting said original beam generated from said original beam generator into three output beams;

an interference system for allowing said test light to interfere with said reference light while varying a phase difference between said test light and said reference light for each of said three output beams obtained from said beam splitter; and three imaging devices for imaging interferograms regarding said three output beams obtained from said interference system.

5. The apparatus of claim 1, wherein said typical plane computer computes an averaged plane surface shape of said test surface using the least square approximation on the basis of said surface shape information obtained from said surface shape analyzer.

6. A method for surface shape measurement using an interferometer, comprising the steps of:

imaging at least three interference fringe images each generated by emitting a coherent light to an object having a test surface and to a reference having a reference surface so that a test light reflected from said test surface interferes with a reference light reflected from said reference surface while varying a phase difference between said test light and said reference light from image to image;

analyzing said at least three interference fringe images to obtain surface shape information of said test surface;

computing a typical plane of said test surface on the basis of said surface shape information;

computing an oblique angle of said typical plane to said reference surface; and automatically adjusting the attitude of said test surface relative to said reference surface on the basis of said oblique angle.

7. The method of claim 6, wherein said step of imaging comprises imaging said at least three interference fringe images in sequential by slightly displacing said reference surface along the optical axis of said coherent light.

8. The method of claim 6, wherein said step of imaging comprises imaging said at least three interference fringe images in sequential by varying the wavelength of said coherent light emitted to said object and said reference.

9. The method of claim 6, wherein said step of imaging comprises:

generating an original beam by superimposing said test light and said reference light within the same observing surface in a state of null-interference;

splitting said original beam into three output beams;

allowing said test light to interfere with said reference light while varying a phase difference between said test light and said reference light for each of said three output beams; and imaging interferograms regarding said three output beams simultaneously by three imaging devices.

10. The method of claim 6, wherein said step of computing a typical plane comprises computing an averaged plane surface shape of said test surface using the least square approximation on the basis of said surface shape information obtained from said step of analyzing.

* * * * *